(12) United States Patent
Jouenne et al.

(10) Patent No.: US 10,378,323 B2
(45) Date of Patent: Aug. 13, 2019

(54) POLYMER FLOW CONTROL DEVICE

(71) Applicants: Typhonix AS, Bryne (NO); Total S.A., Courbevoie (FR)

(72) Inventors: Stéphane Jouenne, Bizanos (FR); Trygve Husveg, Varhaug (NO)

(73) Assignees: Typhonix AS, Bryne (NO); Total S.A., Courbevoie (FR)

( * ) Notice: Subject to any disclaimer, the term of this patent is extended or adjusted under 35 U.S.C. 154(b) by 0 days.

(21) Appl. No.: 15/781,983

(22) PCT Filed: Dec. 8, 2016

(86) PCT No.: PCT/NO2016/050258
§ 371 (c)(1),
(2) Date: Jun. 6, 2018

(87) PCT Pub. No.: WO2017/105250
PCT Pub. Date: Jun. 22, 2017

(65) Prior Publication Data
US 2018/0355704 A1    Dec. 13, 2018

(30) Foreign Application Priority Data
Dec. 18, 2015 (NO) .................................. 20151750

(51) Int. Cl.
*E21B 34/02* (2006.01)
*F16K 47/08* (2006.01)
(Continued)

(52) U.S. Cl.
CPC .............. *E21B 43/20* (2013.01); *E21B 34/02* (2013.01); *F16K 47/04* (2013.01); *F16K 47/06* (2013.01);
(Continued)

(58) Field of Classification Search
CPC combination set(s) only.
See application file for complete search history.

(56) References Cited

U.S. PATENT DOCUMENTS 2,021,079 A    11/1935 Mittendorf et al.
3,170,483 A     2/1965 Milroy
(Continued)

FOREIGN PATENT DOCUMENTS

WO    WO-2014106635 A1    7/2014
WO    WO-2014178723 A1    11/2014
WO    WO-2015092334 A2    6/2015

OTHER PUBLICATIONS

Wikheim, Martin N., "International Search Report," prepared for PCT/NO2016/050258, dated Feb. 13, 2017, four pages.

*Primary Examiner* — Catherine Loikith
(74) *Attorney, Agent, or Firm* — Winstead PC

(57) ABSTRACT

A water injection flow control device includes a stack of discs or cone-like plates that form spiral-shaped flow conduits. The spiral-shaped flow conduits form at least one revolution about a central point or axis and depart or approach the central point or axis for each revolution. At least some of the spiral-shaped flow conduits have sections in series with alternating cross sectional area for flow and at least some have sections with a serpentine-type shape for flow along the spiral-shaped flow conduits. The spiral-shaped flow conduits have an inlet coupled to an inner or outer end of the spiral shaped flow conduits, an outlet coupled to the other end of the spiral-shaped conduits, and a control member.

17 Claims, 7 Drawing Sheets

Figure 1:
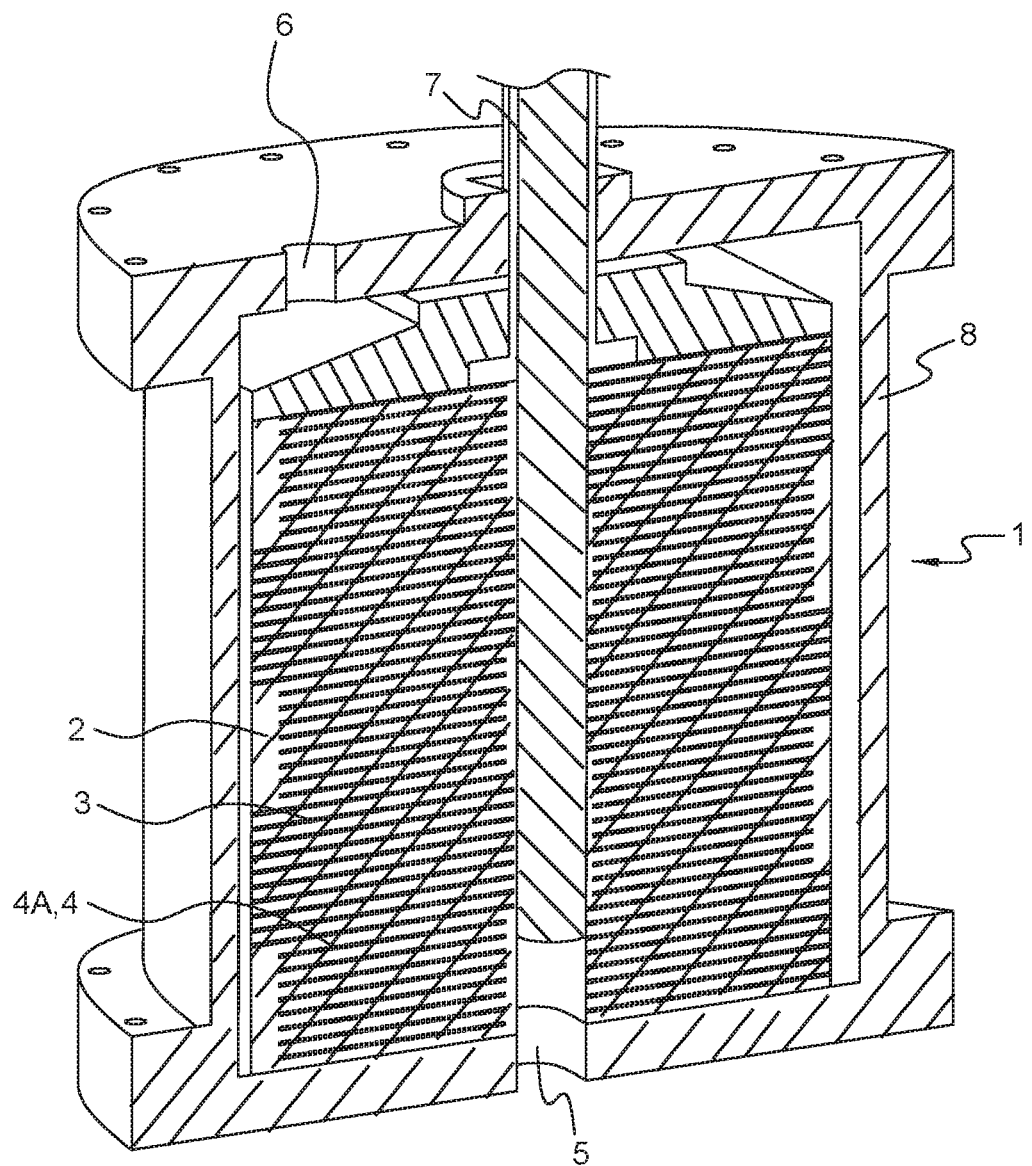
Figure 2A:
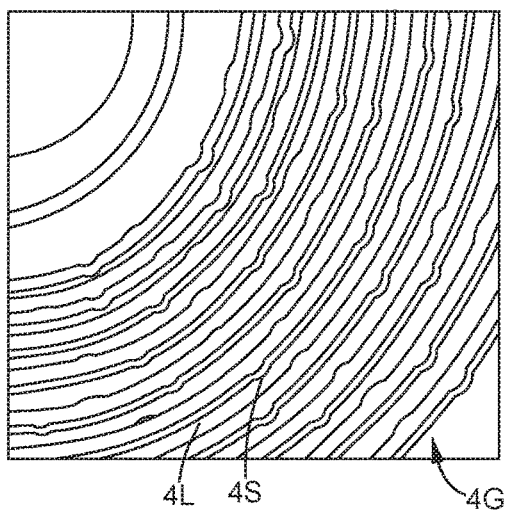
Figure 2B:
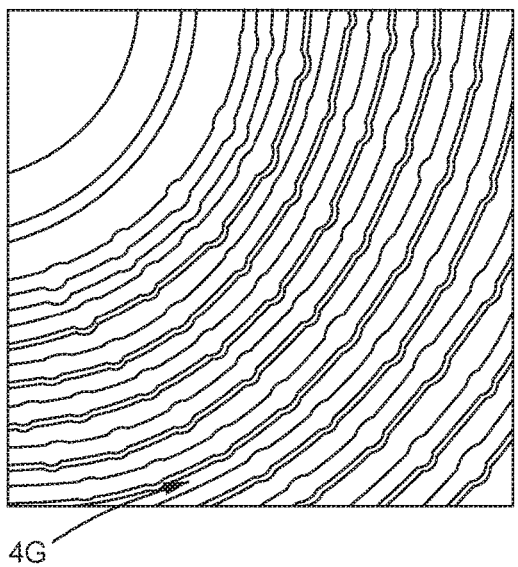
Figure 2C:
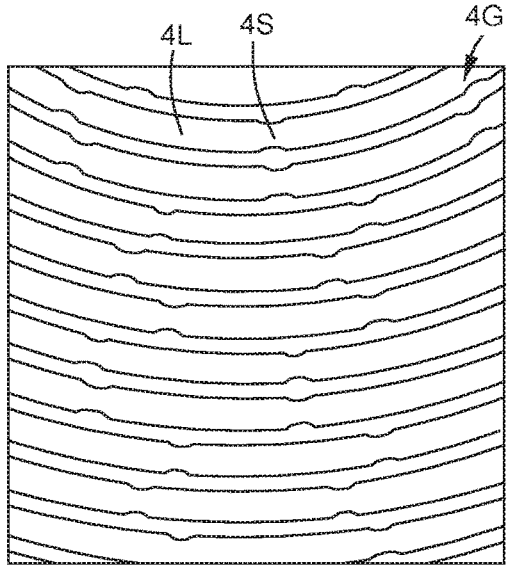
Figure 2D:
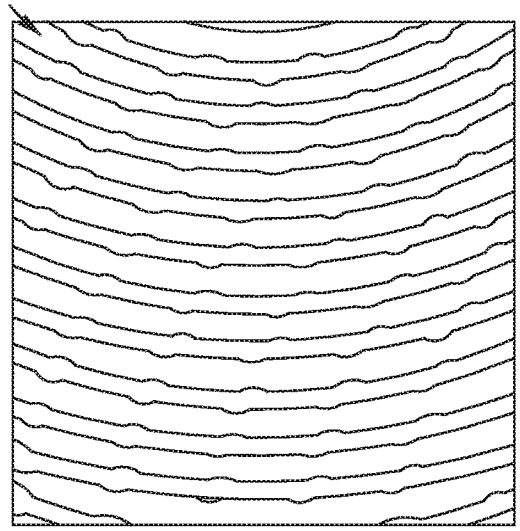

(51) Int. Cl.
    *E21B 43/20*     (2006.01)
    *F16K 47/04*     (2006.01)
    *F16K 47/06*     (2006.01)
    *F16K 47/12*     (2006.01)
    *F15D 1/02*     (2006.01)

(52) U.S. Cl.
    CPC .............. *F16K 47/08* (2013.01); *F16K 47/12* (2013.01); *F15D 1/02* (2013.01)

(56) References Cited

U.S. PATENT DOCUMENTS

| | | |
|---|---|---|
| 3,514,074 A | 5/1970 | Self |
| 4,044,991 A | 8/1977 | Waller |
| 4,276,904 A | 7/1981 | Jackson |
| 4,782,847 A | 11/1988 | Luetzelschwab |
| 7,152,681 B2 * | 12/2006 | Olsen .................... E21B 43/121 166/357 |
| 2003/0188787 A1 | 10/2003 | Steinke |
| 2005/0199298 A1 | 9/2005 | Farrington |
| 2005/0252559 A1 | 11/2005 | McCarty et al. |

\* cited by examiner

POLYMER FLOW CONTROL DEVICE

FIELD OF THE INVENTION

The present invention relates to injection of water containing viscosity-enhancing polymers into reservoirs, for enhanced oil recovery.

BACKGROUND OF THE INVENTION AND PRIOR ART

During oil recovery operations, several wells are drilled in a reservoir. They are divided into injection wells and production wells. In most cases, water is forced into the reservoir through the injection wells to maintain the pressure difference with the surface and ensure the flow of oil through the formation; oil is pushed and replaced by the injected water. Often however, water mobility is higher than oil mobility leading to unstable fronts and viscous fingering. As a consequence, the macroscopic sweep efficiency is poor, large areas of the oil-bearing formation are not swept, and oil is left in place. Increasing the viscosity of the injected water enables to decrease the mobility ratio between water and oil and to improve macroscopic sweep efficiency. As a general rule, acrylamide based copolymers such as Hydrolyzed PolyacrylAMides (HPAM) are used because they represent the best tradeoff between viscosifying power, cost, and industrial availability. Very high molecular weight (Mw) polymers are used in order to maximize their viscosifying power.

A typical water injection system comprises one water injection pump with an injection line that injects water into wells of different hydraulic resistance. To avoid excessive flow into the wells with the lowest hydraulic resistance, a choking valve is installed at the wellhead to control the flow rate injected in each well. A choke coil, a globe valve or other throttling valve device is used for the purpose. Types of polymers used, such as acrylamide based polymers, feasible concentrations and technical solutions for mixing with injection water, for specific reservoir conditions, are in this context assumed to be known in general for the skilled person.

Description of relevant technology can be found in patent publications US 2005/252559 A1, WO 2014/178723 A1, U.S. Pat. No. 4,044,991 A, US 2003/0188787, WO 2015/092334 A2, US 2005/199298 A1, U.S. Pat. Nos. 3,514,074 A, 4,276,904, 3,170,483 A and 4,782,847.

A demand exists for improved technology for injection of water containing viscosity-enhancing polymers into reservoirs.

SUMMARY OF THE INVENTION

The invention meets the demand by providing a water injection flow control device, distinguished in that it comprises:
comprises:
 a stack of discs or cone-like plates, the discs or cone-like plates as stacked or per se comprises in substance spiral shaped flow conduits, the spiral shaped flow conduits comprises at least one revolution, the spiral shaped flow conduit being turned about a central point or axis and departing or approaching said central point or axis for each revolution, at least some of said spiral shaped flow conduits comprises at least one of sections in series with alternating cross section area for flow and a section with serpentine-type shape for flow along the in substance spiral shaped flow conduits,
 said spiral shaped flow conduits has a fluid conduit length of at least 0.2 meter,
 an inlet operatively coupled to an inner or outer end of the spiral shaped flow conduits,
 an outlet operatively coupled to the other end of said conduits than the inlet, and
 a control member.

Preferably, the water injection flow control device comprises sections in series with alternating large and small cross section area for flow, wherein a ratio of at least one dimension in the flow conduit transverse to a central flow line through said sections of large and small cross section areas for flow is in a range 1.05-10 or 1.1-8, more preferably 1.2-5, most preferably about 2. Said alternating sections of large and small cross section area for flow allows a more compact device than the teaching of WO 2014/178723 A1. An alternative feature to the ratio of at least one transverse direction, as specified above, is a ratio between said alternating large and small cross section areas for flow in a range 1.05-10, such as 1.1-8, more preferably 1.2-5, most preferably about 2.

In a preferable embodiment of the water injection flow control device of the invention, at least some of the in substance spiral shaped flow conduits comprises sections with wave-shape or serpentine-type shape in said spiral shaped flow conduits, with sections of constant or variable cross section area in serpentine shape or wave shape along a central flowline of in substance spiral shape. The term "a section with serpentine-type shape for flow along the in substance spiral shaped flow conduits" means a section with wave shape of some kind along a central flowline along the otherwise in substance spiral shaped conduit. The shape of the serpentine-type can be as square waves or sinusoidal waves or combinations between, preferably each of a wave periodicity P, the distance between repeated waves, and a wave amplitude A, the distance between top and bottom of said repeated waves, are between 4d and 40d, wherein P and A are equal or different in any combination and d is a dimension in the flow conduit transverse to a central flow line along the serpentine-type flow or d is the smallest or a typical conduit cross section diameter.

Any combination between variable cross section or wave shape or serpentine shape is possible, in the flow conduits in embodiments of a water injection flow control device of the invention.

A spiral is a shape with at least one full revolution, the spiral shaped curve or conduit being turned about a central point or axis and departing or approaching the central point for each rotation or revolution. Reference can be made to: http://www.merriam-webster.com/dictionary/spiral The spiral shaped conduit can be on or in a flat structure, such as a disc, or on or in a conical surface.

In contrast, a helical conduit is rotated about a central axis without departing or approaching said axis for each rotation.

Without wishing to be bound by theory, the device of the invention provides a prescribed pressure loss (choking) combined with minimal polymer degradation, in a relative compact, low weight unit, by keeping strain, strain rate, fluid acceleration, deceleration and direction changes below limits over which the polymer molecules break up and viscosity decreases. More specifically, water-soluble polymers used for mobility control application are in general high molecular weight polymers that are very sensitive to mechanical degradation. When submitted to extensional flows such as those encountered in contractions or turbulent eddies, polymer coils undergo a coil-stretch transition as stretched. As the chain starts to extend, hydrodynamic force exerted through the friction of the solvent on the stretched chain is increased, and can lead to chain rupture at a critical strain rate $\dot{\varepsilon}_R$. At a given polymer concentration, viscosity is decreasing when molecular weight of the polymer is decreasing. Consequently, chain break up leads to a decrease of the solution viscosity. This degradation is irreversible along with the viscosity loss. In a classical plug and cage choke valve, part of the pressure drop is coming from the passage through small holes and from the collision of the fluid at the interior of the cage. During its passage through the holes, the fluid is subjected to very high strain rate (the extensional component of this type of flow is very high). At the interior of the cage, the fluid is once again submitted to the elongational component of the highly turbulent flow. It explains why polymer degradation is very high in this kind of valve. The invention aims at minimizing the extensional component of the flow and thus, minimizing polymer degradation. However, compared to a design with a constant cross section, additional pressure drop is created thanks to the elastic behavior of the polymer solution. Indeed, in extensional flow, polymer is developing extensional viscosity which can be very high compared to the shear viscosity. There exists a window of strain rate in which polymer develops elongational viscosity without being degraded. By varying the cross section of the channel, we promote the apparition of the elongational viscosity but keep the strain rate under its critical value to minimize polymer degradation. With serpentine geometry, we promote the development of elastic turbulence.

Said alternating sections of large and small cross section area for flow are defined as compared to each other, the small or the large dimension can be equal to the upstream and/or downstream spiral shaped flow conduit cross section area for flow. For example, the conduits can comprise sections with reduced cross section for flow (i.e. sections with small cross section area for flow) in a spiral shaped conduit else having large cross section for flow. Or oppositely, sections with enhanced cross section for flow (sections with large cross section area for flow) in a spiral shaped conduit else having small cross section for flow. Or alternatively, said sections with alternately large and small cross section area for flow are different with respect to cross section for flow compared to upstream and downstream parts of the spiral shaped conduit. Said sections with large cross section area for flow are not necessarily identical. Said sections with small cross section area for flow are not necessarily identical.

Preferably, a distance S between said alternating sections with large and small cross section area for flow is in a range 1 to 40 d, where d is a dimension in the flow conduit transverse to a central flow line through said sections of small cross section areas for flow. Preferably, a dimension d transverse to a flow direction through said sections of small cross section areas for flow is at least 0.5 mm, more preferably at least 2 mm. The dimension d is typically the diameter of a circular flow bore or a side in a quadratic or rectangular flow bore. In a preferable embodiment, the sections with small cross section area for flow have a in substance quadratic cross section shape and the sections with large cross section area for flow have a in substance rectangular cross section shape, or opposite, the ratio of the longest side of the rectangular cross section to the side of the quadratic cross section is in a range 1.05-10, preferably about 2.

Said alternating sections of large and small cross section area for flow, per se, can be according to the teaching of WO 2015/092334 A2, the teaching of which publication is incorporate herein by reference.

The water injection flow control device of the invention preferably comprises one or more of the following features, in any combination:
  a stack of discs or cone-like plates with integrated spiral shaped conduits,
  a stack of discs or cone-like plates having spiral shaped grooves on at least one side, wherein the spiral shaped conduits have been formed by stacking said discs or plates as, and
  a stack of discs or cone-like plates having a spiral shaped opening punched out or otherwise formed and discs or plates without a spiral shaped opening, wherein the spiral shaped conduits have been formed by alternatingly stacking discs or plates with and without spiral shaped opening.

Spiral shaped opening means spiral shaped perforation or hole, through the disc or cone-like plate. Discs or cone-like plates with integrated spiral shaped conduits are for example tightly spiraled pipes or tubes, shaped as discs or cone-like plates.

The water injection flow control device preferably comprises axial channels, as inlet and outlet or parts thereof. The axial channels are preferably parallel to a spiral conduit rotation axis for the stack of discs or plate-like cones. The inlet preferably comprises a central channel, meaning an inner channel, coupled to an inner end of the spiral shaped conduits, preferably but not necessarily coaxial along a centerline about which the conduits are rotated. The outlet preferably comprises an outer channel, as an annular channel or a peripheral channel. An annular channel has annular cross section shape, extending around and along the stack of discs or plates, preferably but not necessarily coaxial along a centerline about which the conduits are rotated. A peripheral channel do not extend around the stack of discs or plates, it is a non-annular channel, having a continuous cross section area for flow, in contrast to an annular cross section area that is closed in a central area. A peripheral channel has advantage with respect to structural strength and control, making it feasible for high-pressure applications. In patent publication WO 2014/178723 A1 merely annular outer channels are illustrated. Which channel that is or is part of an inlet and an outlet, respectively, is interchangeable.

Preferably, the stack comprises or forms spiral shaped conduits of smaller cross section area for flow towards one end of the stack, arranged so that when the control member chokes the flow through the device the conduits remaining open for flow have smaller cross section area for flow than the conduits closed for flow. Thereby undue shear, shear rate and polymer degradation are avoided when the choking and pressure loss is high. Alternatively, the stack comprises or forms spiral shaped conduits of equal or larger cross section area for flow towards one end of the stack, arranged so that when the control member chokes the flow through the device the conduits remaining open for flow have equal or larger cross section area for flow than the conduits closed for flow, respectively. Alternatively, or in addition, the control member can be arranged and operated so as to never close more than 50% or for example 70% closed and 30% open of the conduits during normal operation. However, the control member can close the device for flow. If the flow rate is low, more than 50% of the disks can be closed. However, there exist a preferable flow rate per disk QD for a maximal pressure drop DP max (that will lead to minimal degradation). Depending on the flow rate Q, a certain number of disks N will be open (N=Q/QD). If the desired pressure drop DP is lower than DP max, then the number of disks open to flow will be higher than N.

In some preferable embodiments, the conduit cross section area for flow is enlarged at an inlet and at an outlet for each spiral shaped flow conduit. The enlarged cross sections, at the inlet especially, reduces the acceleration of the fluid and thus minimized the elongational component of the flow. In other words, the velocity differential in the direction of the flow called the strain rate, shear rate and turbulence are minimized and as a consequence, polymer degradation is minimized. At the outlet, compression at the tube enlargement is minimized. Preferably, the cross section area for flow is enlarged by up to at least 100%, more preferably at least 500% or 1000%, at an inlet part and at an outlet part for each spiral shaped flow conduit. Preferably, each of said inlet and outlet parts have increased cross section area covering less than 10% of each spiral shaped conduit length. Preferably, the spiral shaped conduits have an in substance even cross section area for flow between said inlet and outlet parts, except for sections with smaller cross section for flow and/or serpentine/wave shaped conduit, arranged as sections according to the invention.

The transitions from even flow conduit cross section area to and between sections with small and large cross section area for flow preferably is gradual, which reduces strain rate, turbulence and shear rate. Said gradual transitions preferably contains no sharp edges or corners, to minimize or to keep strain rate, turbulence and shear rate below a limit at which breaking up of polymers occur.

The number of sections in series of alternating large and small cross section area for flow is at least two, more preferably at least ten, such as 20 or 50 or 100, 500, 1000 or more.

For serpentine shape channels, the number of periodic elements, or wave periods, is at least one, preferably at least two, more preferably at least 100, such as 2000 or 500 or 1000 or more.

Typically each conduit has length in the range 0.2-1000 m, preferably 0.2-200 m, or 0.2-100 m, 1-100 m or 1-25 m, or 0.2-50 m, or 2-50 m.

Typically, the number of revolutions about a central point or axis is from 1 and higher, such as 2, 5, 10, 15, 20, 30, 40, 50, 75, 100 or higher.

The number of conduits is at least two. Preferably, the number of conduits is in the range 2-2000, typically 5-200, such as 10-100, for example about 50.

In some preferable embodiments, all conduits are identical.

The water injection flow control device preferably comprises an outer housing or cover containing said stack, the outer housing is dimensioned to withstand a wellhead or topside shut in pressure of a water injection well, or a maximum water injection pressure. Alternatively, the outer housing or cover is dimensioned to withstand a lower maximum pressure.

Preferably, the device is dimensioned to choke the pressure up to 30 bar, more preferably 40 bar, even more preferably up to 50 bar or 100 bar or 200 bar or more, most preferably up to about 50 bar for many embodiments. The pressure and flow rate control provided is pressure drop in the range from about 0 to above 200 bar, typically 0-50 bar or 2 to 40 bar, and related flow rate drop from 100% to 0%, typically 100% to 50% or 100% to 80% during normal operation.

Preferably, the sections in series of alternating large and small cross section area for flow are arranged symmetrically about a center line of flow in the spiral shaped conduits, which provides more pressure reduction compared to polymer degradation. Preferably, the transitions between, into and out from said sections are gradual, which provides more pressure reduction compared to polymer degradation. Alternatively, the variations in cross section are not symmetrical, for example the width of a groove in a disc or punched out opening vary asymmetrical about a central or general spiral shaped line of flow in the spiral shaped conduit.

The cross section area for flow of each conduit is smaller than the cross section of said inlet and outlet, which have cross section equal to or larger than a nominal flow cross section or nominal bore for pipes or tubes upstream of the device. Nominal bore is as defined according to pipe or tubing standards. The conduit cross sections in sum can be equal to the cross section of inlet and/or outlet channels, as specified in WO 2014/178723 A1, or smaller. More preferably, the cross section of each conduit is smaller than the cross section of each of said inlet and outlet but in sum the conduit cross sections is larger, since this provides pressure reduction with further reduction of polymer degradation. Preferably, the cross section area of said conduits in sum equals more than 110% of the cross section area of said inlet and outlet or a nominal area for flow upstream or downstream of the device, preferably more than 130%, more preferably more than 150%, most preferably at least 200%. This means that a larger number of small flow opening conduits better can control the pressure while minimizing the shear on the fluid and hence the breaking up of polymers solved in the injection water that is controlled. Accordingly, a cross section for flow through the spiral shaped conduits in a device of the invention is preferably in a range 200-0%, or 150-0%, or 130-0%, or 110-0% of a nominal bore upstream, dependent on the number of conduits in line, as controlled by the control member.

Preferably, the outlet and inlet of the conduits are arranged at 90° to said conduits, with respect to radial and axial directions. This eliminates or reduces axial forces acting on said discs or plates, improving mechanical stability and facilitating the control of the device. Each of the inlet and outlet of the conduits can still have a rotational direction vector relative to one or both of the inlet and outlet channels.

A control member, preferably an axial control member, in one or both of inlet and outlet channels, controls the pressure drop and flow rate by adjusting an axial position, or other control position, of said control member in one or both channels. One control member in both channels can reduce the forces acting on the device. The control member or members are coupled to linear and/or rotational actuators as convenient. A control member with fine threads, operated by a linear/rotational actuator, is preferable for many embodiments.

Parts of the device of the invention can be made out of polymer or composite material, instead of steel or other metal, if the forces acting on the device and parts thereof permit. For example, the discs or cone-like plates comprising spiral shaped grooves or spiral shaped openings can be made of polymer, for example POM (polyoxymethylene) or PEEK (polyetheretherketone), or composite material. Grooves can be made by machining/milling, molding, such as injection molding, casting or otherwise. Spiral shaped openings can be made by punching, pressing, molding, casting, forging or otherwise. Alternating layers of polymer or composite discs or plates, with spiral shaped grooves or openings, between metal/alloy discs or cone like plates without said grooves or openings, represent preferable embodiments of the invention. On each spiral disc, the pressure difference in channels separated by a wall (in the radial direction) is small (DP=DP valve/number of turns). As a consequence, discs can be machined or made in polymer or composite material. It has the advantage to reduce the weight and the cost of the valve. In addition to polymer injection application, this low cost valve can be used for water injection.

The invention also provides a water injection system, comprising: a water injection pump and a polymer mixing station operatively coupled to a water source, for mixing polymer into the water and pumping the mixture; two or more injection wells operatively connected, one or more injection wells having a lower pressure than a highest pressure injection well.

The water injection system is distinguished in that it comprises a water injection flow control device operatively arranged for at least each lower pressure well, for adjusting the pressure, the water injection flow control device comprising:
  a stack of discs or cone-like plates, the discs or cone-like plates as stacked or per se comprises in substance spiral shaped flow conduits, the spiral shaped flow conduits comprises at least one revolution, the spiral shaped flow conduit being turned about a central point or axis and departing or approaching said central point or axis for each revolution, at least some of said spiral shaped flow conduits comprises at least one of sections in series with alternating cross section area for flow and a section with serpentine-type shape for flow along the in substance spiral shaped flow conduits,
  said spiral shaped flow conduits has a fluid conduit length of at least 0.2 meter,
  an inlet operatively coupled to an inner or outer end of the spiral shaped flow conduits,
  an outlet operatively coupled to the other end of said conduits than the inlet, and
  a control member.

The water injection system can comprise a water treatment station, as required and well known. The polymer mixing station can be of prior art type and the polymers used can be those known of having the desired viscosity-enhancing effect, in mixing concentration known in the art.

In a preferable embodiment of the water injection system of the invention, the water injection pump is according to the teaching of WO 2014/106635 A1, "centrifugal pump with coalescing effect, design method and use thereof", the teaching of said publication is incorporated herein by reference.

The invention also provides use of a water injection flow control device of the invention, for pressure control of injection water with solved polymer, and for general water injection.

Typically each conduit has length in the range 0.2-1000 m, preferably 0.2-200 m, or 0.2-100 m, 1-100 m or 1-25 m, or 0.2-50 m, or 2-50 m.

Typically, the number of revolutions about a central point or axis is from 1 and higher, such as 2, 5, 10, 15, 20, 30, 40, 50, 75, 100 or higher.

The number of conduits is at least two. Preferably, the number of conduits is in the range 2-2000, typically 5-200, such as 10-100, for example about 50.

In some preferable embodiments, all conduits are identical.

Each of the water injection flow control device and the water injection system of the invention can include any feature as here described or illustrated, in any operative combination, each such combination is an embodiment of the present invention.

FIGURES

Figure 3:
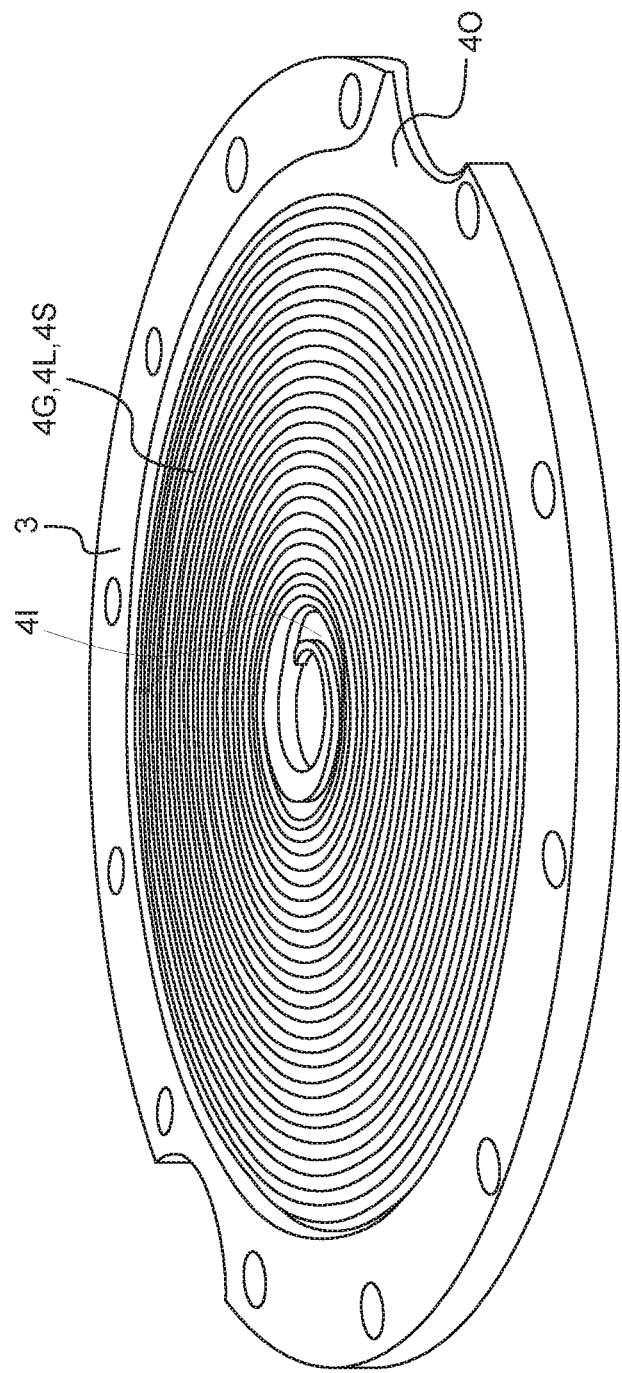
Figure 4:
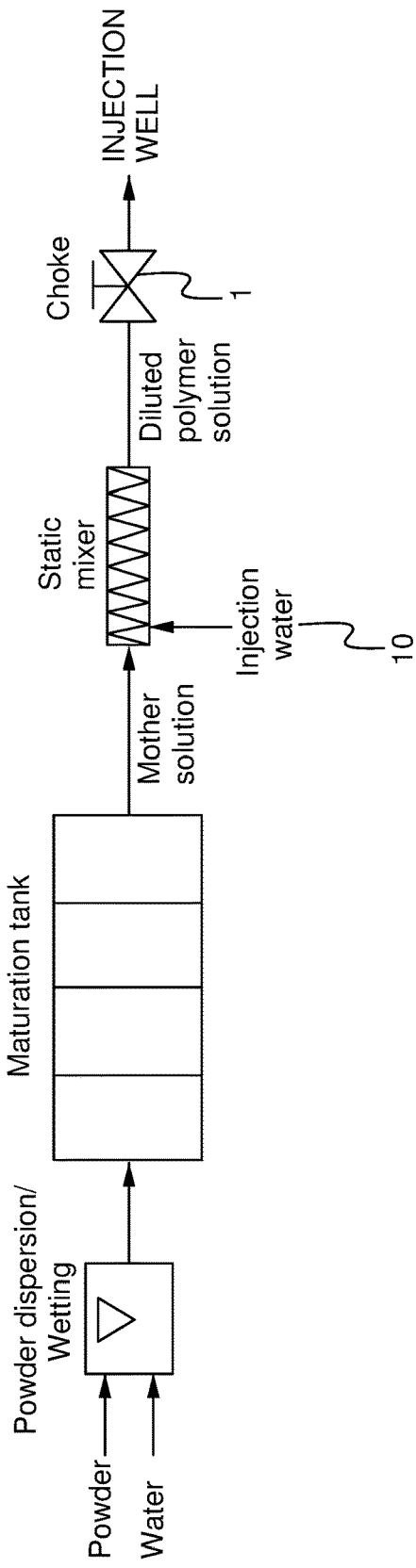
Figure 5:
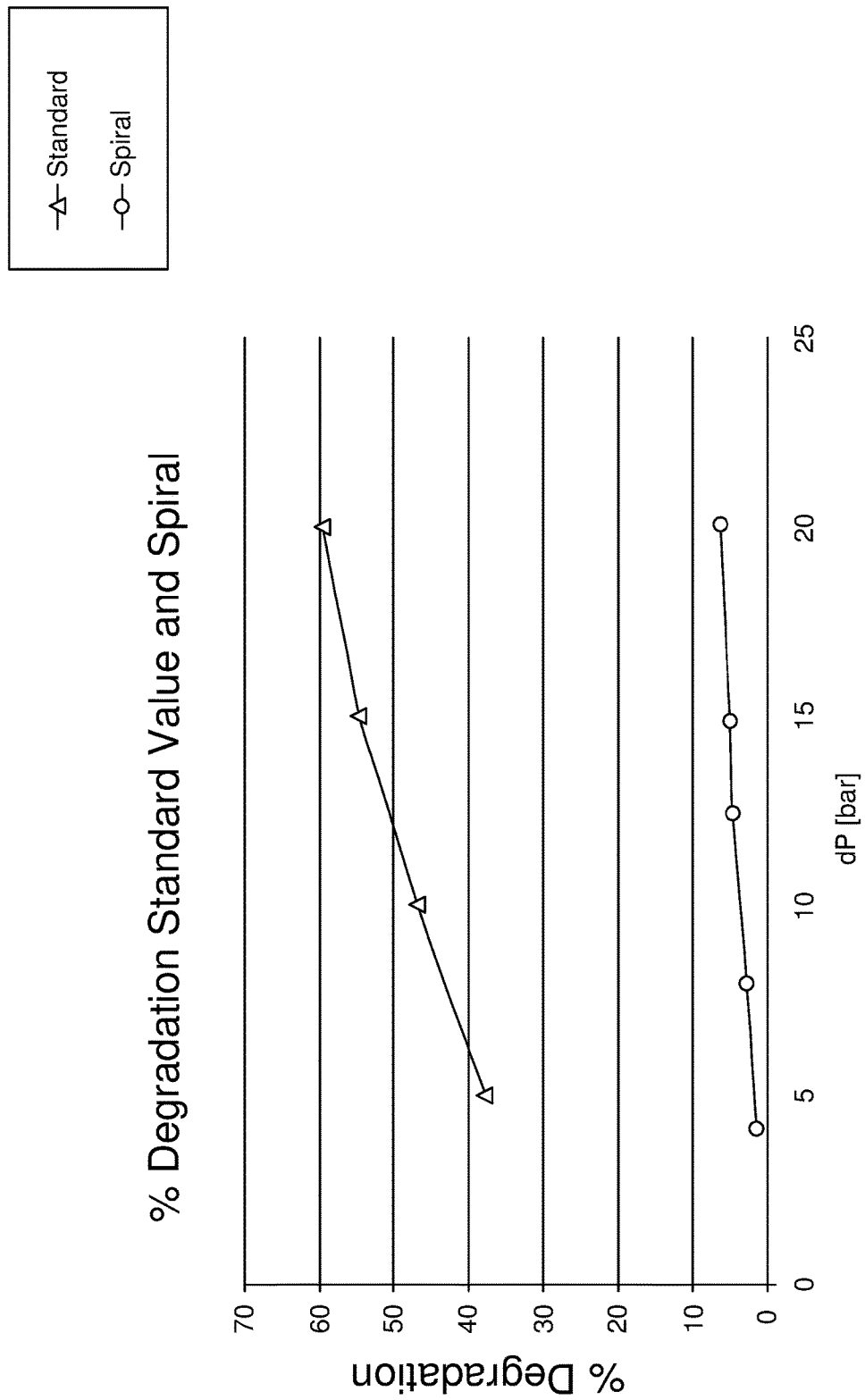
Figure 6A:
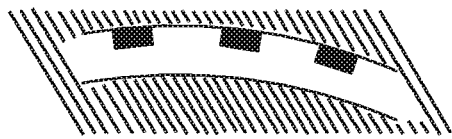
Figure 6B:
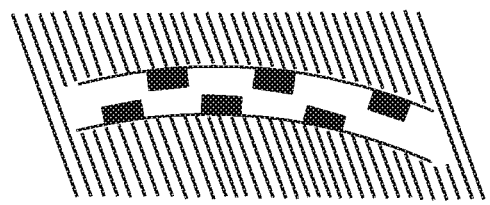
Figure 6C:
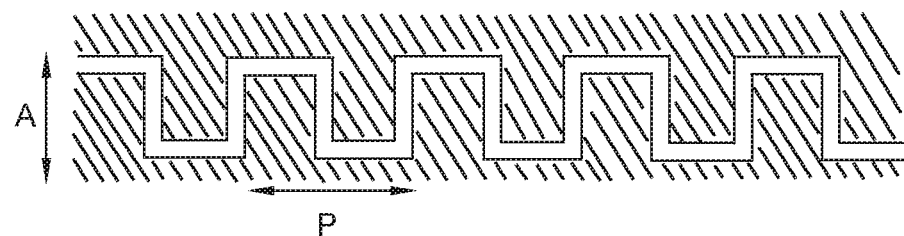
Figure 6D:
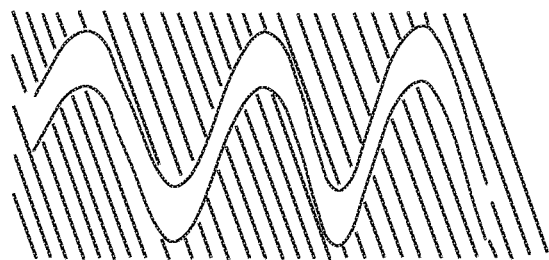
Figure 7A:
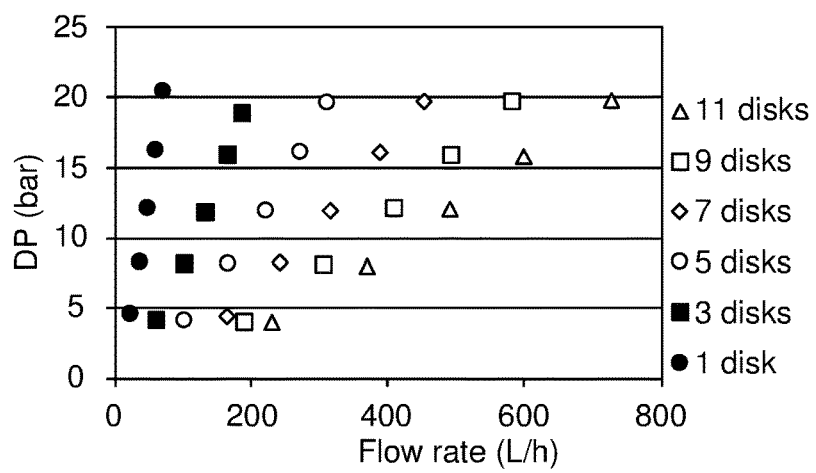
Figure 7B:
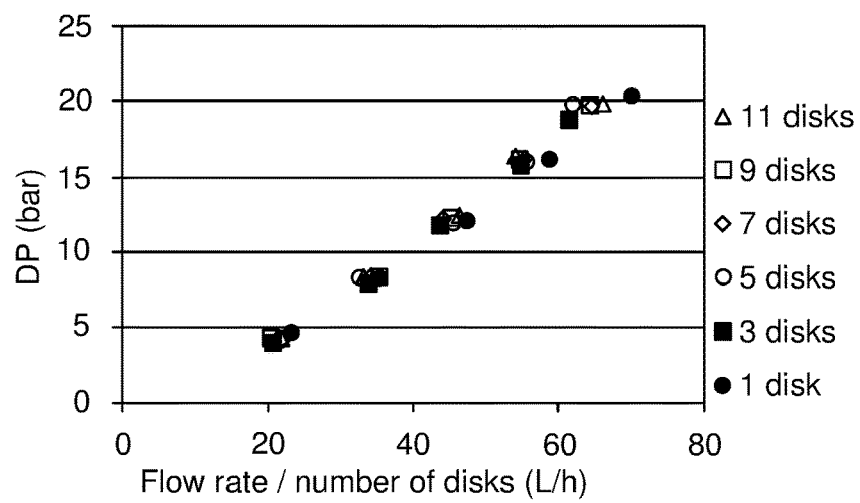
Figure 7C:
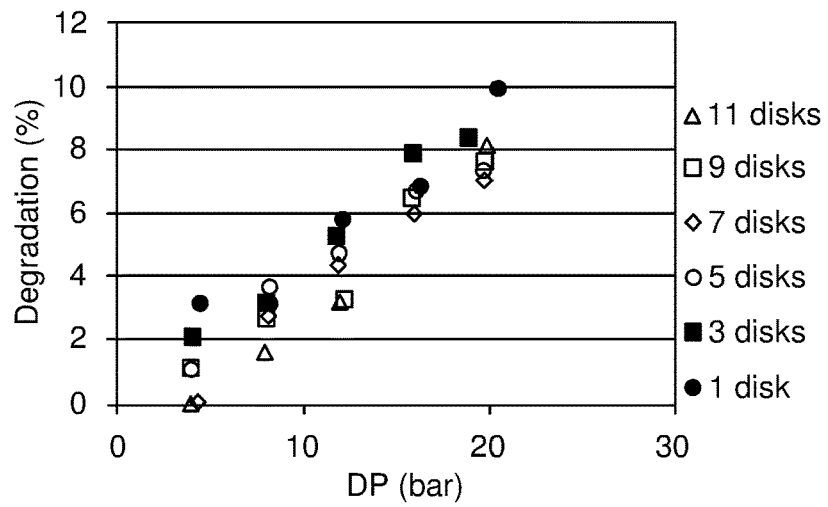

FIG. 1 illustrates an embodiment of a water injection flow control device of the invention, FIG. 2 illustrates sections in series with alternating large and small cross section area for flow in flow conduits in a device of the invention, and FIG. 3 illustrates a disc in a water injection flow control device of the invention, FIG. 4 illustrates a system for water injection according to the invention, FIG. 5 provides some examples on the technical effect of the invention, FIGS. 6A-6D illustrate details of some embodiments comprising a serpentine-type conduit in a device of the invention, and FIGS. 7A-7C illustrate some of the performance of a device of the invention.

DETAILED DESCRIPTION

FIG. 1 illustrates a water injection flow control device 1 of the invention. The device comprises a stack 2 of discs 3, the discs as stacked comprises in substance spiral shaped flow conduits 4, said spiral shaped flow conduits comprises sections in series with alternating large and small cross section area for flow 4A, wherein a ratio of at least one dimension in the flow conduit transverse to a central flow line through said sections of large and small cross section areas for flow is in a range 1.05-10. The device comprises an inlet 5, or part thereof, coupled to an inner end of the spiral shaped flow conduits, an annular outlet 6 operatively coupled to an outer end of said conduits, and a control member 7 arranged in the inlet. In addition, the device comprises a housing 8, containing the stack of discs.

The illustrated embodiment of the device of the invention comprises a stack of discs with a spiral shaped groove on one side of each disc, the other side is flat or plain, the discs as stacked form the spiral shaped conduits between them, along the spiral shaped grooves. Details of the structure are easier to observe in FIGS. 2 and 3.

FIG. 2 illustrates sections in series with alternating large and small cross section area for flow in flow conduits in a device of the invention, as four detail illustration, each comprising spiral shaped grooves 4G with alternating large 4L and small 4S cross section area for flow in the respective flow conduits as formed by stacking the discs. The depth of the groves is constant, only the width vary between sections with large and small cross section. If said widths are 4L and 4S, respectively, the ratio 4L/4S is in a range 1.05-10. The transition between said alternating sections are gradual, without sharp edges. FIG. 3 illustrates a single disc 3, in a water injection flow control device of the invention, comprising a groove 4G with said alternating sections 4G, 4L. The groove or conduit cross section area for flow is enlarged at an inlet 4I and at an outlet 4O for each spiral shaped flow conduit, by having larger width of the groove or conduit.

As an alternative to flat discs, cone-like plates can be used in a water injection flow control device of the invention, which can be preferable for high pressure water injection wells, since a longer or equal conduit length at reduced outer diameter thereby is possible.

FIG. 4 illustrates a system for water injection according to the invention. More specifically, a mother polymer solution is in a static mixer or a similar unit mixed with injection water from a pump 10. The mixture is choked down to a lower pressure in a water injection flow control device 1 of the invention. Parallel arrangements are provided at least for each injection well having lower injection pressure than the highest pressure water injection well.

FIG. 5 provides some examples on the technical effect of the invention. More specifically, the polymer degradation with a water injection flow control device of the invention is compared to the polymer degradation with an industry standard valve, at identical conditions. While a standard valve results in polymer degradation from about 40% to 60% at choking effect (dP) from about 5 bar to 20 bar, the device of the invention results in polymer degradation from about 2% to 7% at choking effect (dP) from about 5 bar to 20 bar. This has significant effect on the recovery of oil, the oil production rate and the polymer consumption.

FIG. 6A illustrates a flow conduit with asymmetrical cross section for flow in a device of the invention. FIGS. 6B and 6C illustrate details of conduits with serpentine-type shape for flow along the in substance spiral shaped flow conduit, in a device of the invention. FIG. 6D illustrates details of another embodiment of a serpentine-type conduit in a device of the invention.

FIGS. 7A-7C illustrate some of the performance of a device of the invention, more specifically with 11 discs in substance as illustrated in FIGS. 2 and 3. In FIG. 7A, the flow rate and differential pressure is illustrated while the control member holds 1, 3, 5, 7, 9 and 11 discs open for flow, respectively. In FIG. 7B, the corresponding flow rate per disc is illustrated, the flow rate per disc is rather constant. In FIG. 7C, the polymer degradation versus pressure loss (DP) is illustrated. The degradation per disc is about identical for a given pressure loss. For a given pressure loss DP, more discs can be coupled inline by operating the control member, for increased flow rate at identical degradation.

The technical effect of the present invention is surprising, testing and simulations indicate that polymer degradation can be reduced from 60-70% and down to 10-20%, by the new device of the invention and based on calculation of degradation, Deg %, according to the formula:

$$Deg\ \% = \frac{\eta_o - \eta_{deg}}{\eta_o - \eta_{H2O}} \times 100$$

Where:
$\eta_o$=Viscosity of inlet
$\eta_{deg}$=Viscosity of sample (degraded)
$\eta_{H2O}$=Viscosity for water Some test results are even more favorable, as illustrated in FIG. 5.

The invention claimed is:

1. A water injection flow control device comprising:
a stack of discs or cone-like plates, the stack of discs or cone-like plates forming spiral shaped flow conduits between the stack of discs or cone-like plates, the spiral shaped flow conduits comprising at least one revolution, the spiral shaped flow conduits being turned about a central point or axis and departing or approaching the central point or axis for each revolution;
an inlet operatively coupled to either inner or outer ends of the spiral shaped flow conduits and an outlet operatively coupled to the other of the inner or outer ends of the spiral shaped flow conduits;
a control member configured to control a pressure drop across the inlet and the outlet;
wherein at least one of the spiral shaped flow conduits comprises a series of alternating cross-sectional areas, the alternating cross-sectional areas comprising alternating large and small cross-sectional areas; and
wherein the spiral shaped flow conduits have a fluid conduit length of at least 0.2 meters.

2. The water injection flow control device according to claim 1, wherein a ratio of a dimension in the spiral shaped flow conduit transverse to a central flow line through the large cross-sectional areas and the small cross-sectional areas is in a range of 1.05-10.

3. The water injection flow control device according to claim 1, wherein a distance S between the series of alternating cross-sections is in a range of 1 to 40 d, where d is a dimension in the spiral shaped flow conduits that is transverse to a central flow line through the series of alternating cross-sections, and wherein d is at least 0.5 mm.

4. The water injection flow control device according to claim 1, wherein the water injection flow control device comprises one or more of the following features, in any combination:
a stack of discs or cone-like plates with integrated spiral shaped conduits;
a stack of discs or cone-like plates having spiral shaped grooves on at least one side, wherein the spiral shaped flow conduits are formed by stacking the stack of discs or cone-like plates; and
a stack of discs or cone-like plates having a spiral shaped opening punched out or otherwise formed and discs or plates without a spiral shaped opening, wherein the spiral shaped flow conduits have been formed by alternatingly stacking the discs or cone-like plates with and without spiral shaped opening.

5. The water injection flow control device according to claim 1, wherein the stack of discs or cone-like plates comprises or forms spiral shaped conduits of smaller cross section area for flow towards one end of the stack of discs or cone-like pates and is arranged so that when the control member chokes a flow through the water injection flow control device the spiral shaped flow conduits remaining open for flow have a smaller cross-sectional area for flow than the spiral shaped flow conduits closed for flow by the control member.

6. The water injection flow control device according to claim 1, wherein the inlet and the outlet of each spiral shaped flow conduit is enlarged relative to a portion of each spiral shaped flow conduit between the inlet and the outlet of each spiral shaped flow conduit.

7. The water injection flow control device according to claim 1, wherein a number of sections in series of alternating large and small cross section area for flow is at least two.

8. The water injection flow control device according to claim 1, further comprising an outer housing or cover containing the stack of discs or cone-like plates, the outer housing or cover is designed to withstand a water injection well wellhead pressure, and the water injection flow control device is dimensioned to choke a pressure of a fluid up to 50 bar.

9. The water injection flow control device according to claim 1, further comprising a central channel in the stack of discs or cone-like plates connected to an inner end of the spiral shaped flow conduits, and a peripheral channel arranged inside an outer periphery of the stack of discs or cone-like plates or by an aligned recession in the outer periphery of each of the stacked discs or cone-like plates but inside an outer cover, connected to an outer end of the spiral shaped flow conduits, and the control member is arranged operatively in at least one of the channels.

10. The water injection flow control device according to claim 1, wherein the series of alternating cross-sectional areas are arranged symmetrically about a center line of flow in the spiral shaped flow conduits, and transitions between the series of alternating cross-sections are gradual.

11. The water injection flow control device according to claim 1, wherein each spiral shaped flow conduit has a length in a range of 0.2-50 m, and a number of conduits is in a range of 2-2000.

12. The water injection flow control device according to claim 1, wherein cross-sectional areas of the spiral shaped flow conduits is more than 110% of a cross-sectional area of a channel coupled to the inlet for flow upstream of the water injection flow control device.

13. A water injection flow control device comprising:
a stack of discs or cone-like plates, the stack of discs or cone-like plates forming spiral shaped flow conduits between the stack of discs or cone-like plates, the spiral shaped flow conduits comprising at least one revolution, the spiral shaped flow conduits being turned about a central point or axis and departing or approaching the central point or axis for each revolution;
an inlet operatively coupled to either inner or outer ends of the spiral shaped flow conduits and an outlet operatively coupled to the other of the inner or outer ends of the spiral shaped flow conduits;
a control member configured to control a pressure drop across the inlet and the outlet;
wherein at least one of the spiral shaped flow conduits comprises a serpentine-type shape;
wherein the serpentine-type shape can comprise square waves or sinusoidal waves or combinations of square and sinusoidal waves, wherein each wave of the square or sinusoidal waves comprises a periodicity P, and a wave amplitude A, wherein a distance between a top and a bottom of repeated waves is between 4 and 40 d, and wherein d is a dimension in the spiral shaped flow conduits that is transverse to a central flow line along the spiral shaped flow conduits; and
wherein the spiral shaped flow conduits have a fluid conduit length of at least 0.2 meters.

14. The water injection flow control device according to claim 13, wherein the serpentine-type shape comprises a series of alternating cross-sectional areas, the alternating cross-sectional areas comprising alternating large and small cross-sectional areas.

15. A water injection system comprising:
a water injection pump and a polymer mixing station operatively coupled to a water source, for mixing polymer into water and pumping the mixture;
two or more injection wells operatively connected, one or more injection wells having a lower pressure than a highest pressure injection well,
a water injection flow control device operatively arranged for at least each lower pressure well, for adjusting pressure, the water injection flow control device comprising:
a stack of discs or cone-like plates, the stack of discs or cone-like plates forming spiral shaped flow conduits between the stack of discs or cone-like plates, the spiral shaped flow conduits comprising at least one revolution, the spiral shaped flow conduit being turned about a central point or axis and departing or approaching the central point or axis for each revolution;
an inlet operatively coupled to either inner or outer ends of the spiral shaped flow conduits and an outlet operatively coupled to the other of the inner or outer ends of the spiral shaped flow conduits;
a control member configured to control a pressure drop across the inlet and the outlet;
wherein at least one of the spiral shaped flow conduits comprises a series of alternating cross-sectional areas, the alternating cross-sectional areas comprising alternating large and small cross-sectional areas; and
wherein the spiral shaped flow conduits have a fluid conduit length of at least 0.2 meters.

16. A water injection system comprising:
a water injection pump and a polymer mixing station operatively coupled to a water source, for mixing polymer into water and pumping the mixture;
two or more injection wells operatively connected, one or more injection wells having a lower pressure than a highest pressure injection well;
a water injection flow control device operatively arranged for at least each lower pressure well, for adjusting pressure, the water injection flow control device comprising:
a stack of discs or cone-like plates, the stack of discs or cone-like plates forming spiral shaped flow conduits between the stack of discs or cone-like plates, the spiral shaped flow conduits comprising at least one revolution, the spiral shaped flow conduit being turned about a central point or axis and departing or approaching the central point or axis for each revolution;
an inlet operatively coupled to either inner or outer ends of the spiral shaped flow conduits and an outlet operatively coupled to the other of the inner or outer ends of the spiral shaped flow conduits;
a control member configured to control a pressure drop across the inlet and the outlet;
wherein at least one of the spiral shaped flow conduits comprises a serpentine-type shape;
wherein the serpentine-type shape can comprise square waves or sinusoidal waves or combinations of square and sinusoidal waves, wherein each wave of the square or sinusoidal waves comprises a periodicity P, and a wave amplitude A, wherein a distance between a top and a bottom of repeated waves is between 4 and 40 d, and wherein d is a dimension in the spiral shaped flow conduits that is transverse to a central flow line along the spiral shaped flow conduits; and
wherein the spiral shaped flow conduits have a fluid conduit length of at least 0.2 meters.

17. The water injection system according to claim 16, wherein the serpentine-type shape comprises a series of alternating cross-sectional areas, the alternating cross-sectional areas comprising alternating large and small cross-sectional areas.

* * * * *